United States Patent [19]
Nevarez et al.

[11] Patent Number: 5,781,724
[45] Date of Patent: Jul. 14, 1998

[54] METHOD AND SYSTEM FOR INTEGRATING ADDITIONAL FUNCTIONALITY INTO A LOGIN SYSTEM

[75] Inventors: Carlos A. Nevarez, Orem; Kenneth Paul White, Sandy, both of Utah

[73] Assignee: Novell, Inc., Provo, Utah

[21] Appl. No.: 742,506

[22] Filed: Nov. 1, 1996

[51] Int. Cl.$^6$ .................................................. G01F 11/00
[52] U.S. Cl. ........................................ 395/186; 395/188.01
[58] Field of Search ............................. 395/186, 187.01, 395/188.01, 609; 380/23, 25

[56] References Cited

U.S. PATENT DOCUMENTS

| | | | |
|---|---|---|---|
| 4,604,708 | 8/1986 | Lewis | 364/900 |
| 5,101,374 | 3/1992 | Sinutko, Jr. | 395/186 |
| 5,241,594 | 8/1993 | Kung | 380/4 |
| 5,564,054 | 10/1996 | Bramnick et al. | 395/186 |
| 5,579,479 | 11/1996 | Plum | 395/186 |
| 5,638,448 | 6/1997 | Nguyen | 380/29 |
| 5,655,077 | 8/1997 | Jones et al. | 395/187.01 |

OTHER PUBLICATIONS

Jones et al., "Authenication in a UNIX Network Environment Using Smart Cards", British Telecommunications Research Labs, pp. 32–37, 1990.

Huang et al., "Non–Interactive Password Authentications Without Password Tables", IEEE, pp. 429–431, 1990.

Codewright, The Professional Programmer's Editor, Programmer's Reference, Jul., 1994, pp. 26–43.

Hardy copy of slide show presentation entitled *Cross–Platform Login Application and API*, Brainshare, Mar., 1995.

Hard copy of slide show presentation entitled *Inside the Netware login API: How to Participate in the Netware Login Script Process* Brainshare, Mar., 1995.

*Primary Examiner*—Robert W. Beausoliel, Jr.
*Assistant Examiner*—Scott T. Baderman
*Attorney, Agent, or Firm*—Dinsmore & Shohl LLP

[57] ABSTRACT

A system and method for integrating additional functionality into a login system which includes registering a login extension operative to receive notification of an event generated by the login system. The login extension provides additional functionality and response to the received notification. The login extension is registered by the login system and authenticated to ensure that the login extension has proper access rights. An event manager of the login system communicates login events to the registered login extension which then provides additional desired functionality.

18 Claims, 7 Drawing Sheets

METHOD AND SYSTEM FOR INTEGRATING ADDITIONAL FUNCTIONALITY INTO A LOGIN SYSTEM

TECHNICAL FIELD

The present invention relates generally to computer-implemented login systems capable of authenticating a user to a computer environment, and more particularly to a login agent which enables the seamless and secure integration of additional login system functionality through login extension modules.

BACKGROUND OF THE INVENTION

Login systems help ensure secure access of computer maintained resources. Login systems can include an authentication system and a login agent. A login agent acquires an identifier such as a userid and a password from a user interested in accessing controlled computer resources, and communicates the identifier to the authentication system which determines if and what type of access the user associated with the identifier should be given to the computer resource.

Login agents vary in complexity. Some login agents merely accept a userid and password and communicate them to the authentication system, while others not only obtain user identifiers, but also implement additional functionality, such as script file command processing, for example. Such command processing includes reading one or more command structures and taking certain action based upon the commands listed in the command structure. While such command processing can provide additional flexibility and achieve certain user-specific login processing, conventional login systems provide only a limited set of commands and typically do not provide for command extension.

Login systems are fairly prevalent and used widely to ensure secure access to controlled resources. Such login systems are typically developed and provided by the vendor of the particular controlled resource, and do not permit integration with other login systems. Since each vendor of a controlled computer resource provides its own separate login system, a user must login and be authenticated to each controlled computer resource independently of the other, requiring repetitive and lengthy interaction between the user and the various login systems. For example, the user may first have to login and be authenticated to the operating system controlling the user's computer. The user may then have to login and be authenticated to the network environment to which the computer is coupled in order to access network resources. The user may then have to login and be authenticated to a database environment in order to access a particular database program. In addition to their inability to integrate with one another, login systems rarely provide a mechanism for allowing the enhancement of its features. One reason login systems do not allow integration with other systems, and do not allow functional enhancement is because in order to ensure security and eliminate the possibility of external programs from intercepting a userid/password identifier, the login system refuses to relinquish control from the point the userid/password identifier is entered until the point the identifier is authenticated. Unfortunately, such conventional monolithic login systems make functional enhancement difficult.

Because of the large number of computer resources in use today and the wide variety of computer environments, many computer installations find the limited flexibility of such conventional login systems unsatisfactory. One reason is because users quickly tire of entering the same userid/password information to various login systems on a daily basis. Rather, a user would like to enter the information once when they first login for the day, and automatically be authenticated to each relevant computer controlled resource. Another reason is because a particular installation may find the vendor-supplied userid/password identifier-based login agent insufficient, and may wish to enhance the login agent to require an additional identifier such as a fingerprint. It would be highly desirable for the login agent to integrate the site-developed enhancement seamlessly so it appears as part of the vendor-supplied login system, and yet be able to prevent external programs from interrupting the login process and wrongfully acquiring identifier information. Further, the login process should be integral such that script file processing is not carried out unless both identifiers, the userid/password and the fingerprint identifier, have been successfully authenticated by the authentication system. If the vendor-supplied login system is written in a monolithic manner to prevent interruption by external programs, such seamless and integral login processing is impossible to achieve.

Another example of enhancing an existing login agent is extending the login process to include executing a virus checking program on a user's workstation before allowing the user access to the network, in order to ensure that the workstation does not contain a virus which could spread to other workstations over the network. If the vendor of the login system does not provide the capability to allow execution of site-specified software during the login process, the site may have to rely on other mechanisms to accomplish this, which may be circumventable.

Some systems allow limited enhancement of the functionality of the system. For example, the Premia® Codewright™ editing environment software allows limited functional enhancement by allowing an externally developed function to receive a certain system event. The function can then evaluate the event and request the Codewright software to take certain actions. However, external functions have access to only certain system events, and cannot functionally replace an entire component of the system, such as the user interface or a command processing component, nor is there provided a mechanism for participating in the overall control of the editing environment. Further, the Codewright software provides no mechanism for ensuring that the externally developed function can be trusted to participate in the system.

It is apparent that providing a login system which allows enhancement or replacement of various functions provided by the login agent, such that the enhancement becomes an integral part of the overall login process while maintaining security of the overall login system would be highly desirable.

SUMMARY OF THE INVENTION

Accordingly, it is one object of the present invention to provide a method and system which enables the seamless and secure integration of additional login functionality of a login agent through login extension modules.

It is another object of this invention to provide an event-driven login system which authenticates a login extension before the login extension can participate in the login process.

It is yet another object of this invention to provide a modular login agent which allows a login extension to enhance or replace a particular login agent module.

It is still another object of this invention to provide a login system which allows the creation and implementation of new script processing commands.

It is yet another object of this invention to provide a secure single signon login agent which can authenticate a user to multiple computer environments with a single signon.

Additional objects, advantages and other novel features of the invention will be set forth in part in the description that follows, and, in part, will become apparent to those skilled in the art upon examination of the invention. The objects and advantages of the invention may be realized and obtained by means of the instrumentalities and combinations particularly pointed out in the appended claims.

To achieve the foregoing and other objects and in accordance with the purposes of the present invention as described above, a method for integrating additional functionality into a computer implemented login system having event-driven functionality is provided. The method includes registering with the login system a first login extension operative to receive notification of events and operative to provide additional functionality in response to the received notification, initiating the registered login extension and authenticating the registered login extension to the login system to ensure secure participation. The login system recognizes the occurrence of an event and communicates notification of the event to the registered login extension. The registered login extension can choose to ignore the event, or provide certain functionality. The registered login extension can then inform the login system to continue the login process, or abort and refuse access to the user.

The login system according to this invention preferably provides default login agent functionality through one or more default login extensions. The one or more default login extensions provide user interfacing, script processing, and additional functionality. The login agent communicates an identifier, such as a userid and password, to the authentication system. According to one embodiment of this invention, a registered login extension can supplement the default login extensions, or can entirely replace the default login extensions.

According to one embodiment of this invention, registered login extensions are themselves authenticated before being permitted to participate in the login process. The authentication process can be carried out by receiving an authentication key from the registered login extension, and comparing the received authentication key to a group of valid authentication keys maintained by the login system, to determine if the received key is a valid key. If the authentication key is not a valid authentication key, notification of events will not be communicated to the registered login extension. If the received authentication key is a valid authentication key, a pointer to the registered login extension is accepted and maintained by the login system for passing events to the registered login extension. Another mechanism for achieving authentication of registered login extension is by requiring each requested login extension to have a digital signature which is authenticated before allowing the login extension to participate in the login process.

According to another embodiment of this invention, the login system maintains a hierarchy of registered login extensions, providing various levels of registered login extension control. The registered login extension is registered at a particular level of the hierarchy at the time of registration. For example, the login extension can register as either a primary or a secondary login extension. A registered primary login extension essentially supersedes a specified default login extension provided by the login system, and thus controls the processing of that component of the login agent, either alone or in conjunction with the superseded default login extension. Such control can include, for example, providing an entirely new interface to the login system, such as one that can require entry of a user's fingerprint.

Before being permitted to participate in the login process, the registered login extension must be authenticated to the login system. After being properly authenticated, the registered primary login extension passes to the login system a structure which includes a pointer to the registered primary login extension. The registered primary login extension has access to the login system's default login extension functions. The login system then communicates each event to the registered primary login extension which determines which events to process itself, and which to pass on to the default login extensions.

A registered secondary login extension is placed in a list of registered secondary login extensions, and receives an event only after the primary login extension(s) have processed the event. A registered secondary login extension can prevent subsequent registered secondary login extensions from receiving the event. The login system also allows a registered secondary login extension to be initiated and receive only events associated with specific phases of the login process, such as during the authentication phase, or the script processing phase.

Communication of events to the login extensions are achieved with an event manager which maintains the login extension hierarchy, and interacts with the login extensions to determine appropriate subsequent processing of the event after each login extension has received the event and returned a particular condition code.

Registered login extensions can be implemented within a login extension module. The login extension module preferably includes not only the registered login extension, but also a login exception extension. After the registered login extension is properly authenticated, the login extension module will pass a pointer to the login exception extension to the event manager for processing of error conditions generated by the registered login extension. If the registered login extension returns a condition code other than OK or ABORT, the event manager will communicate the event to the registered login extension's login exception extension to allow the exception extension to attempt to resolve the problem. If the login exception extension successfully resolves the problem, it can return a RETRY condition code, which informs the event manager to communicate the event to the registered login extension again. Permitting such an exception extension enables a login extension to focus entirely on success conditions, and enables modularity of exception code which can be easily used with various login extensions.

Thus, the login system according to this invention achieves substantial flexibility in allowing functionality to be added to the default functionality provided by the login system, in a secure and integral manner.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different obvious aspects, all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF THE PREFERRED EMBODIMENT

The login system according to this invention is event driven. In an event driven system, functionality occurs when an event is generated and communicated to the appropriate process, which performs certain actions based upon the particular event. Event driven software is known to those skilled in the art, and will not be described in detail herein.

Figure 1:
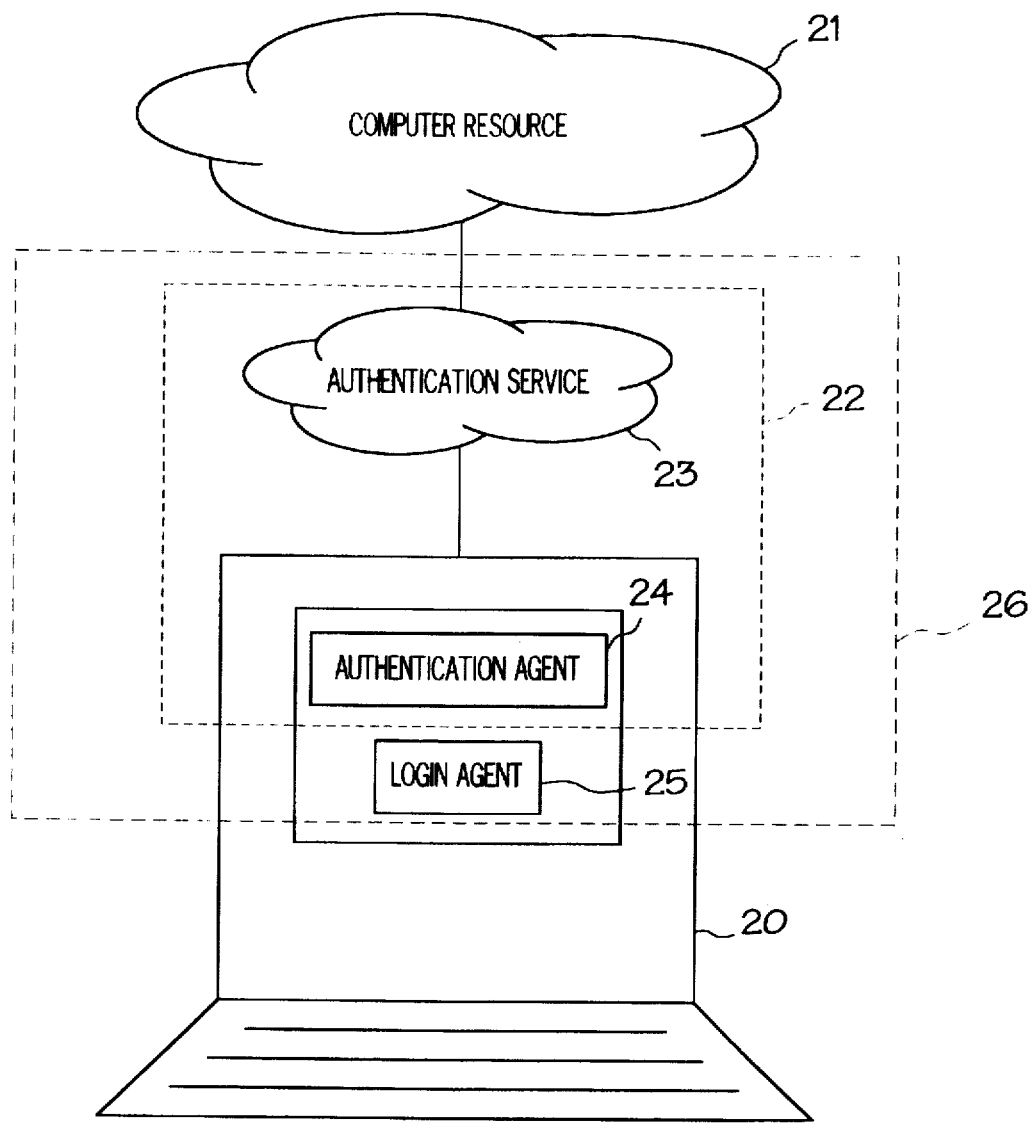
FIG. 1 is a schematic view of a login system according to one embodiment of this invention.

Referring now to the drawings, FIG. 1 shows a schematic view of a login system according to one embodiment of this invention. Workstation 20 is coupled to computer resource 21. Login system 26 secures computer resource 21 from unauthenticated access, and includes authentication system 22 and login agent 25. Authentication system 22 comprises authentication service 23 and authentication agent 24. When a principal, such as a user, wishes to access computer resource 21, login agent 25 requests an identifier such as a userid and password, which is communicated to authentication agent 24. Authentication agent 24 is responsible for communicating the identifier to authentication service 23, and if properly authenticated by authentication service 23, to maintain the authenticated state of the connection during future communication between workstation 20 and computer resource 21. Authentication service 23 receives the userid/password identifier, and determines if the identifier is valid. If it is, authentication service 23 communicates the successful authentication to authentication agent 24.

Authentication of an identifier refers to the process the login system uses to determine if an identifier is valid. Particular authentication techniques vary among login system providers. Computer resource 21 can represent any controlled computer environment, such as a network, for example.

Login agent 25 includes such functionality as acquiring the appropriate identifier from the principal and interfacing with authentication system 22 to ensure the identifier is valid, as described above, and providing additional features such as script file processing. A script file comprises a plurality of commands which can be executed during login processing. For example, a script file can include commands which map local drive letters on workstation 20 to shared drives available on computer resource 21. Another example of a command is one which clears the screen of workstation 20 after the login process completes to eliminate the remnants of the login process from the screen.

Despite the flexibility achievable with script file processing, such functionality is limited to those commands implemented by the login system. Unlike conventional login systems, the login system according to this invention is event driven, and allows a site-developed registered login extension to extend or replace functionality provided by login agent 25, including new script processing commands. The ability to allow site developed login extensions to participate in the login process allows a site to customize the login process as they desire. For example, a particular site may wish to execute a virus checking program on workstation 20 each time a principal is successfully authenticated to the company network, before actually giving the principal access to the network to ensure that workstation 20 cannot spread a virus to the network. While processing script files, the login system according to this invention parses each command to determine what the command is, and passes an event identifying the command along with a pointer to the script file command line to each login extension. One way of implementing such functionality according to the login system of this invention is for the site to create a new command, such as RUNPROG. The syntax of the RUNPROG command can be such that the command will precede the name of the program to execute. To implement the command, the script file is edited to include the line RUNPROG VIRUSCHK.EXE, for example. The site also develops a registered login extension which accepts the script file command string from the login system, recognizes the RUNPROG keyword, and executes the program following the keyword in the command string. When the login system processes the script file line containing this command, an UNKNOWN_COMMAND event is generated because the command is not known to the login system. The UNKNOWN_COMMAND event is passed to each login extension, along with a pointer to the script file command line. When the registered login extension which was developed to implement this command receives the UNKNOWN_COMMAND event, it examines the command line and determines if the command is the RUNPROG command. If it is, the login extension extracts the name of the program from the passed command line, and executes the program. Because of its event driven and modular nature, and since the site-developed registered login extension was authenticated to the login system before being permitted to participate in the login process, the login system according to this invention enabled the integration of such login functionality in a seamless and secure manner. Further, the user at workstation 20 is unable to determine whether functionality provided by the login system is an inherent function of the login system or is provided by a registered login extension.

Although the particular events used can vary among login systems, the login events, excluding IO events, used according to one embodiment of this invention are set forth in Table 1, below. Each event can have three associated parameters, each of which is also communicated to the registered login extension along with the event itself.

TABLE 1

| EVENT NAME | NUM | PARAM 1 | PARAM 2 | FLAGS |
|---|---|---|---|---|
| AVAILABLE_DRIVE | 309 | $n^{th}$ network drive | none | none |
| BIND_ATTACH | 17 | ptr to UserID structure (server, user, password) | none | None |
| BIND_SCRIPT_SERVER | 38 | ptr to string (server name) | ptr to string (user name) | none |
| CAPTURE_PRINTER | 301 | ptr to capture command | capture command args | none |
| CLEAR_SCREEN | 19 | none | none | none |
| CMD_LINE_ARG_DONE | 10 | count(argc) | none | none |
| CMD_LINE_BIND_LOGIN | 6 | none | none | none |
| CMD_LINE_HELP | 11 | none | none | none |
| CMD_LINE_NS | 3 | none | none | none |
| CMD_LINE_SCRIPT_FILE | 5 | ptr to string | none | none |
| CMD_LINE_SERVICE | 1 | ptr to string (tree or server name) | none | none |
| CMD_LINE_TREE | 7 | none | none | none |
| CMD_LINE_USER | 2 | ptr to string (user name) | none | none |
| CONN_AUTH | 54 | ptr to UserID structure | connection ID | none |
| CONN_GET | 53 | ptr to SrvcConn structure | none | none |
| DCACHE_ADD | 302 | none | none | none |
| DCACHE_FIND | 303 | none | none | none |
| DISP_BANNER | 52 | none | none | none |
| DISP_FILE | 22 | ptr to string (directory path and file name) | ptr to script line | filter |
| DISP_LINE | 42 | ptr to string (line to display) | none | none |
| DISP_LTIME | 29 | none | none | none |
| DO_GOTO | 305 | ptr to ScriptInfo structure | ptr to original script line | script id |
| DOS_BREAK | 23 | ON orOFF | none | none |
| DOS_COMSPEC | 20 | ptr to string (directory path and file name for command processor) | original script line for error display if necessary | search drive number *n network drive or drive letter |
| DOS_PC_COMPAT | 35 | none | none | none |
| DOS_SWAP_PATH | 41 | ptr to string (directory path) | none | none |
| DOS_VERIFY | 24 | ON orOFF | none | none |
| DRIVE | 25 | ptr to string(drive letter) | none | none |
| DS_CONTEXT | 21 | ptr to string (full or partial NDS name) | none | none |
| EXEC | 27 | ptr to string (dir path and file name) | none | none |
| EXIT | 26 | ptr to string (keyboard string for keyboard buffer) | none | none |
| FIRE_PHASERS | 28 | count | ptr to string (optional) (dir path and file name) | PC_COMPAT flag |
| GET_FIRST_NETWORK_DRIVE | 315 | ptr to NWCCode for the network drive letter | none | none |
| GET_SCRIPT_LINE | 14 | ptr to ScriptInfo structure | ptr to nparam | none |
| GET_LOCATION_NAME | 314 | none | none | none |
| INCLUDE | 43 | ptr to ScriptInfo structure | script id | none |
| INITIALIZE | 0 | none | none | none |
| MACHINE | 30 | ptr to string (machine name) | none | none |
| MAP_ADD | 44 | ptr to MapRec structure | none | MAP_FLAG_..s |
| MAP_CHANGE | 46 | ptr to MapRec structure | none | MAP_FLAG_..s |
| MAP_DEL | 45 | ptr to MapRec structure | none | none |
| MAP_DISP | 48 | ptr to MapRec structure | none | none |
| MAP_ERR | 50 | ON orOFF | none | none |
| MAP_MOVE | 47 | none | none | none |
| MAP_MSG | 49 | none | none | none |
| MEMBER_OF | 31 | ptr to UserID structure | none | none |
| NO_BANNER | 9 | none | none | none |
| NO_DEFAULT | 32 | none | none | none |
| NOTHING | 67 | ptr to string | none | none |
| NOTIFY_LOGIN_NAMES | 312 | none | none | none |
| NOTIFY_PARENT_WINDOW | 310 | none | none | none |
| NOTIFY_PROGRESS | 313 | none | none | none |
| OPEN_SCRIPT | 13 | ptr to ScriptInfo structure | none | none |
| PARSE_SCRIPT_LINE | 311 | ptr to ScriptInfo | ptr to string (prepared script line) | none |
| PAUSE | 34 | none | none | none |
| POST_SCRIPTS | 51 | none | none | none |
| PRE_LOGIN | 98 | none | none | none |
| PRE_SCRIPTS | 12 | none | none | none |
| PRESCRIPT_CLS | 4 | none | none | none |

TABLE 1-continued

| EVENT NAME | NUM | PARAM 1 | PARAM 2 | FLAGS |
|---|---|---|---|---|
| PROFILE | 36 | ptr to string (NDS object name) | none | none |
| RESOLVE_USER_NAME | 8 | ptr to UserID structure | none | context change indicator |
| REWIND_SCRIPT | 16 | script id | none | none |
| RUN_SCRIPT | 60 | ptr to string (directory path and filename) | none | none |
| SCRIPT_BREAK | 15 | ON orOFF | none | none |
| SET_ENV_VAR | | ptr to string (environment var) | ptr to string (value) | temp/perm flag |
| SYNCH_LIST_BLD | 95 | none | none | none |
| SYNCH_LIST_UPD | 96 | none | none | none |
| SYNC_TIME_FLAG | 40 | ON orOFF | none | none |
| TERM_CMD | 33 | ptr to status exit code | none | none |
| TERMINATE | 18 | code | none | none |
| TREE_ATTACH | 44 | ptr to UserID structure | none | none |
| UNKNOWN | 99 | ptr to string (unrecognized line) | none | none |

For example, with reference to the example above regarding the implementation of the RUNPROG command, the registered login extension would look for an UNKNOWN (number 99) event, and upon receiving such event would use PARAM1 (a pointer to the script file command line) to determine if the command is the RUNPROG command.

Figure 2:
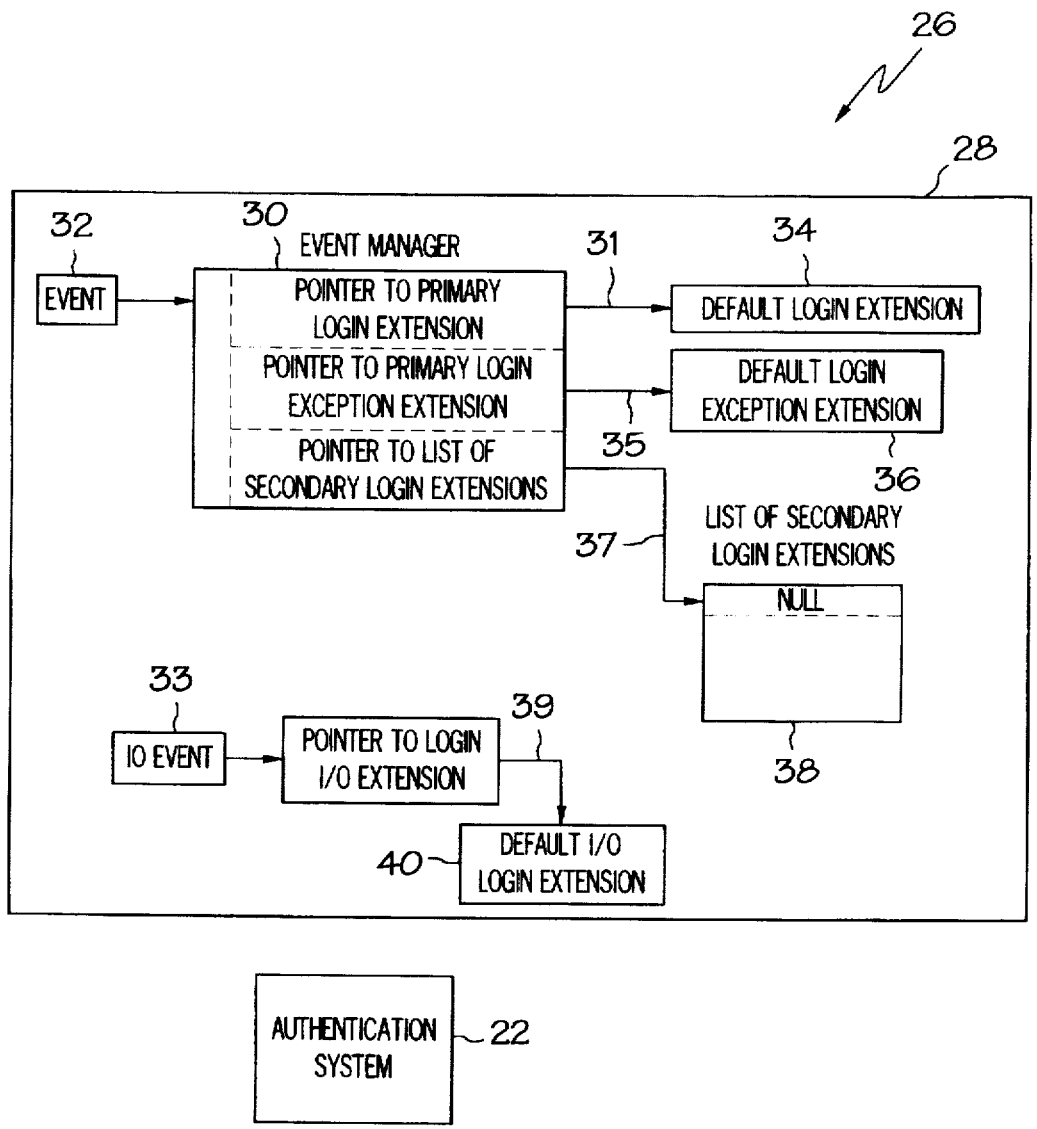
FIG. 2 is a block diagram showing a login system according to one embodiment of this invention without any registered login extensions.

FIG. 2 shows a block diagram of login system 26 according to one embodiment of this invention, prior to registration of a login extension. Login system 26 includes a login agent such as login module 28 which contains event manager 30 and many of the pointer references by which login extensions, both default and registered, are accessed. Event manager 30 manages events such as event 32, which can be any appropriate event, such as those enumerated in Table 1. Event manager 30 communicates event 32 to default login extension 34 via pointer 31. Pointers as used herein refer to any mechanism which can be used to reference a function. Default login extension 34 is preferably provided by the vendor of login system 26, and implements in conjunction with default login exception extension 36 and default login IO extension 40 the majority of the base functionality provided by login system 26.

Login extensions such as default login extension 34 are passed particular parameters for each event communicated to them by event manager 30. Much of the communication of information between event manager 30 and a login extension is accomplished by passing a pointer to a predefined structure between event manager 30 and the login extension. One such structure which can accomplish such transfer of information is shown below in Table 2.

TABLE 2

| pAccessRec pAccess | pointer to access record shown in Table 3 |
| nint deliveryType | BROADCAST, PRIVATE, UNTIL_OK, UNTIL_FAIL |
| nint event | number of event from Table 1 |
| nint eventType | additional information regarding event |
| nint eventSubType | additional information regarding event |
| nparam parm1 | PARAM 1 from Table 1 |
| nparam parm2 | PARAM 2 from Table 1 |
| nflag32 flags | numeric 32 bit value. May contain flag data or values, based on particular event |

The pAccess parameter is a pointer to an Access structure shown below in Table 3.

TABLE 3

| nid | id | unique identifier assigned to each login extension at run-time. |
| NWCCODE | status | Additional status, such as error codes that give additional status from the event handler. |
| NWRCODE | errCode | predefined error messages |
| pEvtHndlr | pEventHandler | pointer to login extension |
| pEvtHndlr | pExceptionHandler | pointer to login exception extention |
| pIOHndlr | pIOHandler | pointer to login IO extension |
| nptr | pUserData | can be used by login extension to pass data to itself |

Thus, a login extension such as default login extension 34 is provided with sufficient information regarding each event to properly process the event. According to one embodiment of this invention, after processing an event the login extension can return a condition code, as set forth below in Table 4.

TABLE 4

| OK | event handled ok |
| RETRY | retry this event to the corresponding login extension (returned by login exception extension) |
| ABORT | stop login processing for this user |
| FAIL | event not processed ok |
| IGNORE | event not processed ok, but behave as if it were |
| STOP_CYCLE | do not pass event to subsequent registered login extensions |

Figure 3:
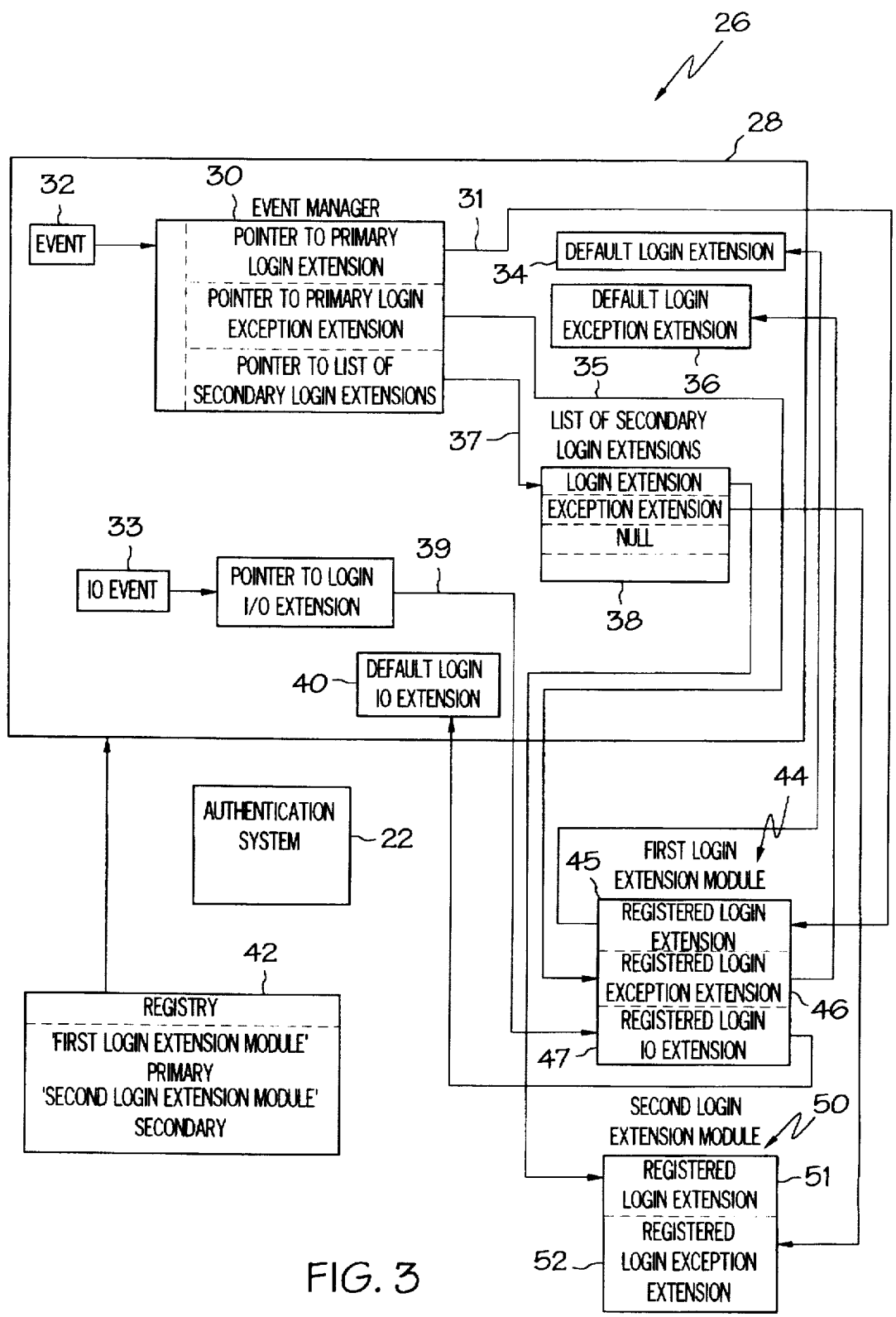
FIG. 3 is a block diagram showing a login system according to one embodiment of this invention with registered login extensions.

There is preferably a particular access structure for each login extension module which includes pointers to the login extensions within that module. Although for clarity and purposes of illustration, FIGS. 2 and 3 show login module 28 maintaining various pointers to default and registered login extensions, according to another embodiment of this invention, login module 28 maintains pointers to access structures, as described above in Table 3. For example, rather than secondary extension list 38 comprising pointers to registered secondary login extensions, the pointers could be to access structures associated with the registered secondary login extensions. Thus, only a single pointer for each login extension module is required to be maintained by secondary extension list 38, and it is the access structure which includes the actual pointers to the login extension, the login exception extension and the login IO extension.

Event manager 30 can take certain action as a function of a condition code returned from a login extension. For example, if default login extension 34 returns a FAIL condition code, event manager 30 will communicate event 32 along with the FAIL condition code and the structure shown in Table 2 to default login exception extension 36 via pointer 35, in an attempt to allow exception extension 36 to attempt to rectify the problem which prevented default login extension 34 from successfully handling the event. Exception extension 36 can use the errCode variable to determine why default login extension 36 could not successfully process the event. For example, if default login extension 36 attempts to allocate memory, and due to memory constraint conditions is unable to allocate a sufficient amount of memory, default login extension 34 can return a FAIL condition code. Event manager 30 can communicate the FAIL condition code and structure set forth in Table 2 to default exception extension 36, which can attempt to eliminate unneeded structures from memory. If default login exception extension 36 is successful, it can return a RETRY condition code, in which case event manager 30 again invokes default login extension 34 with the event. The ability to modularize exception handling achieved by this invention eases the development of login extensions. A majority of the problems which prevent successful processing, such as a lack of available memory, can occur at any time, and is resolved by attempting to free memory, regardless of the particular event being handled. Thus, code to resolve an out-of-memory condition, as well as other common problems, need only be written once, and the developer of the login extension can devote their time to handling success conditions.

Login module 28 also maintains pointer 37 to secondary extension list 38 which comprises a list of pointers to registered secondary login extensions. As shown in FIG. 2, no login extensions have been registered and thus the pointer is NULL (points to nothing). According to one embodiment of this invention, IO events such as IO event 33 are communicated directly to default login IO extension 40 via pointer 39, rather than via event manager 30. However, it is apparent that IO events could be treated similarly to other events and managed by event manager 30, depending upon the particular implementation of login system 26. IO events relate generally to the interaction between a user attempting to access computer resources and login system 26. Valid IO events according to one embodiment of this invention are set forth in Table 5.

TABLE 5

| IO_BANNER | display a login banner |
| IO_CHANGE_PWD | change user a password |
| IO_CLS | clear screen of input device |
| IO_CONFIRM_REATTACH | confirm network reattachment |
| IO_DATA_BLOCK | display a block of data |
| IO_DOS_SWAP_PATH | set DOS swap path |
| IO_ERROR | error occurred, message needed |
| IO_FILE | display a file to user |
| IO_FINISH_UI | finish processing of user interface |
| IO_IDENTITY | displays user identity |
| IO_MSG_PAUSE | pause output display |
| IO_SOUNDS | sound file to be played |
| IO_START_UI | used to gather information required for the authentication system, including userid, password |
| IO_YES_NO | user response needed |

For example, login module 28 can generate an IO_START_UI event and communicate the event to default login IO extension 40, informing login IO extension 40 to obtain a userid and password from a principal at workstation 20. Login IO extension 40 can then display on the principal's computer screen a request to enter a userid and password. Thus, default login IO extension 40 through appropriate IO events handles the interaction between a principal at workstation 20 and login system 26. Login module 28 can then communicate the userid/password identifier to authentication system 22 to authenticate the principal.

FIG. 3 shows a block diagram of login system 26 according to one embodiment of this invention after two login extension modules have been registered and authenticated to login system 26. Login system 26 enables seamless and secure login functionality through login extension modules which notify login module 28 that they wish to participate in the login process and wish to receive notification of login events. Such login extension modules can comprise executable code files, such as a Dynamic Link Library (DLL), which can include a registered login extension, a registered login exception extension, and a registered login IO extension. First login extension module 44 is an example of such a login extension module. According to one embodiment of this invention, before first login extension module 44 can be initiated and authenticated to login module 28, first login extension module 44 was registered in a file or database such as registry 42. Such registration can include storing the name of first login extension module 44 in registry 42 along with certain enumerated options, such as whether the login extension is a primary or secondary login extension. Such registration can be achieved with a program capable of writing the appropriate information to registry 42.

According to another embodiment of this invention, the login system maintains a hierarchy of registered login extensions, providing various levels of registered login extension control. The registered login extension is registered at a particular level of the hierarchy at the time of registration. For example, the login extension can register as either a primary or a secondary login extension. A registered primary login extension can essentially supersede default login extension 34 and/or default login IO extension 40, as described in more detail below, and thus takes precedence over the default login extensions.

A registered secondary login extension is placed in secondary extension list 38, and receives events only after the primary login extensions have processed the events. A registered secondary login extension can prevent other registered secondary login extensions below it in secondary list 38 from receiving the event. Login system 26 preferably is modularized such that the processing flows through certain phases chronologically, such as a user interface phase, an authentication phase and a script processing phase. If processing is divided into such phases, login system 26 can allow a registered login extension to be registered for only particular phases.

According to one embodiment of this invention, login module 28 is initiated to authenticate a principal to the computer environment, and during initiation reads registry 42 to determine if any registered login extensions exist. For the purposes of illustration, as shown in FIG. 3, login module 28 determines that two login extensions have been registered in registry 42. Login module 28 initiates first login extension module 44. Upon initiation, login extension module 44 passes to login module 28 a pointer to the access structure illustrated in Table 3, as well as an authentication key. The program segment to accomplish this call according to one embodiment of this invention is:

ccode=LoginExtInit(&pMyAccess,&myVersion, &loginVersion, &authKey, NULL).

Login module 28 validates the authentication key against a list of valid authentication keys. If properly validated, login module 28 maintains a copy of the pointer to the access structure, and returns an OK condition code. Login extension module 44 then replaces pointer 31 with a pointer to registered login extension 45, pointer 35 with a pointer to registered login exception extension 46, and pointer 39 with a pointer to registered login IO extension 47. The code to accomplish such manipulation of pointers can be accomplished as follows:

myAccess.pEventHandler=(pEvtHndlr)TEvtHandler;

myAccess.pExceptionHandler=(pEvtHndlr) TExpHandler;

myAccess.pIOEventHandler=(pEvtHndlr) TIOEvtHandler.

This code segment assumes that registered login extension 45 is named TEvtHandler, registered login exception extension 46 is named TExpHandler, and registered login IO extension 47 is named TIOEvtHandler. Thus, event manager 30 now has pointers to the registered login extensions in first login extension module 44. The login system according to this invention makes available to properly authenticated login extension modules its default login extension, default login exception extension, and default login IO extension. These default login extensions can be implemented as functions in login module 28 and can be invoked by the registered login extensions. When event manager 30 communicates an event such as event 32 to the primary login extension, it will now be communicated via pointer 31 to registered login extension 45, rather than to default login extension 34. Registered login extension 45 can then process the event and/or pass the event to default login extension 34 for processing. Similarly, event manager 30 will communicate exceptions to registered login exception extension 46 which can then choose to either attempt to handle the exception or communicate it to default login exception extension 36 for processing. IO events will now be communicated via pointer 39 to registered login IO extension 47 which can either process the event or pass it to default login IO extension 40 for processing. Although the invention is being illustrated by showing both default login extension 34 and default login IO extension 40 being replaced with registered login extensions, either one can be replaced without replacing the other.

In this way, first login extension module 44 can either entirely replace the functionality provided by default login extension 34, default login exception extension 36 and default login IO extension 40, or merely supplement such functionality. For example, registered login IO extension 47 can require additional identifying criteria from a principal before allowing access to the controlled resources, in addition to the userid/password identifier required by login module 28. One way such additional identifying criteria could be accomplished is to develop a registered login IO extension 47 which upon receiving an IO_START_UI event, activates a message on workstation 20 indicating that the user should move his eye to an attached retina scanner. Registered login IO extension 47 can then activate the retina scanner and process the retina pattern, either communicating the pattern to authentication system 22 or an externally developed authentication system, and if the pattern is not authenticated, can return an ABORT condition code to abort the login process. If the retina pattern was properly authenticated, registered login IO extension 47 can then either return a value indicating that the user was properly authenticated or can communicate the IO_START_UI event to default login IO extension 40 to allow default userid/password authentication to occur as well.

Login module 28 also invokes second login extension module 50 in a manner similar to that described above with respect to first login extension module 44. However, second login extension module 50 desires to be registered as a secondary login extension. After being authenticated, second login extension module 50 passes to login module 28 a structure as shown in Table 2 containing a pointer to registered login extension 51 and registered login exception extension 52. Login module 28 inserts the pointers to the registered login extensions into secondary extension list 38.

In this manner, login system 26 according to this invention enables seamless and secure login functionality through registered login extensions. Login system 26 according to this invention provides substantial flexibility allowing a registered login extension to actively participate in and even supersede the processing of the default login extensions. Login system 26 seamlessly integrates each registered login extension and authenticates the registered login extensions to ensure that no process will be passed login events unless proper security has been established. The integration of first login extension module 44 and second login extension module 50 occurs automatically and seamlessly upon initial initiation of login module 28. Thus, regardless of what causes initiation of login module 28, whether a user or a program seeks access to a controlled resource, first login extension module 44 and second login extension module 50 will participate in the login process. In this manner, a site can customize login system 26 according to this invention to its specific needs.

The login system according to one embodiment of this invention categorizes each event into one of the following four categories: PRIVATE, BROADCAST, UNTIL_OK and UNTIL_FAIL. An event of type PRIVATE is sent only to a particular login extension, and is not communicated by event manager 30 to all login extensions. An event type BROADCAST is sent to all login extensions. An event of type UNTIL_OK is sent to each login extension, in turn, until any login extension indicates the successful processing of the event. An event of type UNTIL_FAIL causes event manager 30 to communicate the event to each login extension, in turn, until a login extension indicates a failure in processing the event.

The login system according to one embodiment of this invention can allow a login extension to return the following condition codes: OK, RETRY, ABORT, FAIL, IGNORE, and STOP_CYCLE, as set forth above in Table 4. An OK condition code indicates that the login extension successfully handled the event. A RETRY condition code would be returned by a login exception extension, such as default login exception extension 36, after attempting to resolve a problem which caused default login extension 34 to return a FAIL condition. A RETRY indicates that event manager 30 should recommunicate the event to default login extension 34, which can attempt to process the event again. An ABORT condition code is returned to indicate that the login process should be stopped for this user. A FAIL condition code is returned to indicate that the event was not successfully handled. An IGNORE condition code is returned to indicate that the event was not successfully handled, but that processing should continue. A STOP_CYCLE condition code is returned to indicate to event manager 30 that the event should not be communicated to any subsequent login extensions. It is apparent that many different condition codes could be utilized in a login system according to this invention, or even fewer condition codes could be utilized depending on the flexibility desired by a particular login system.

Figure 4:
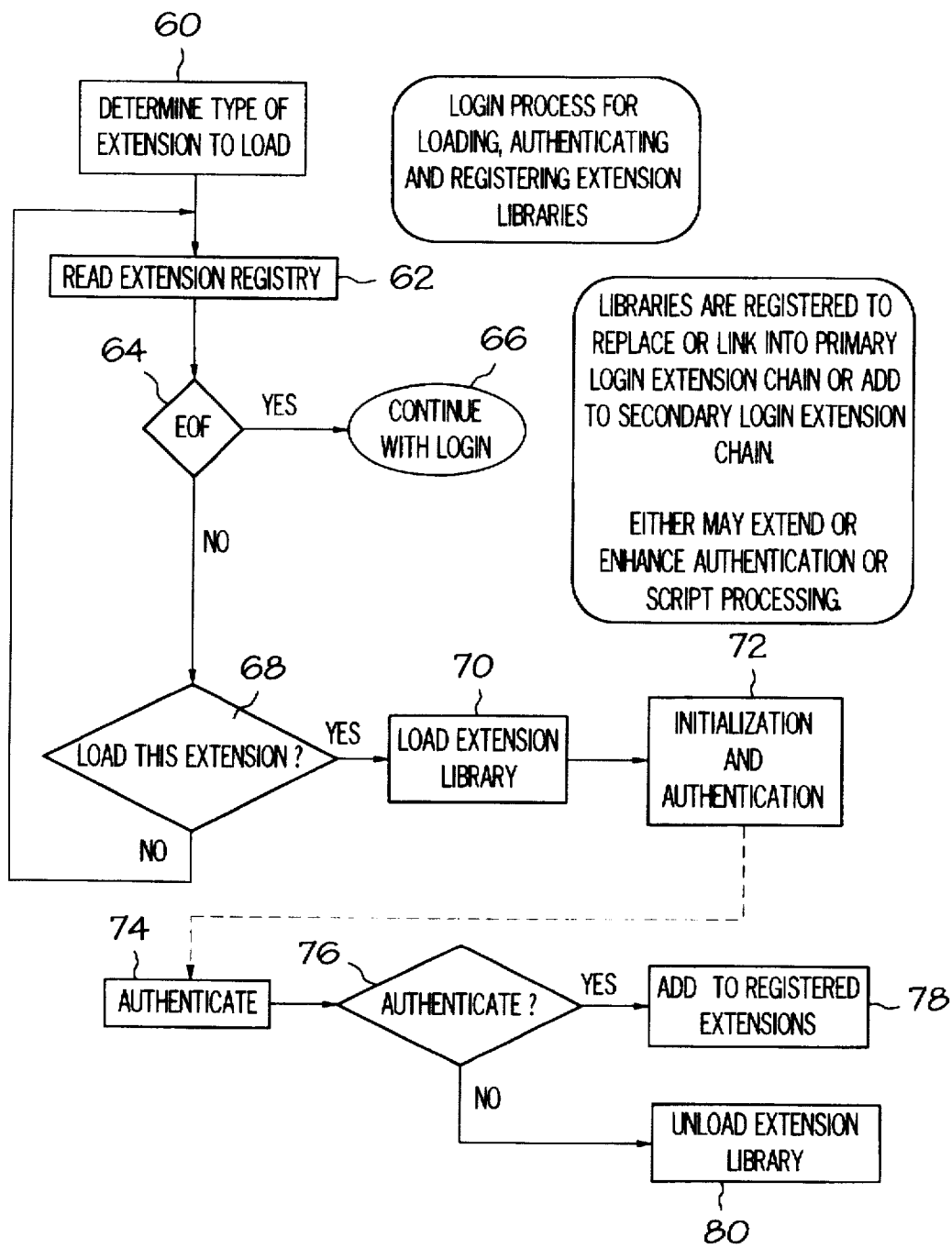
FIG. 4 is a flow diagram illustrating the method according to one embodiment of this invention for initiating registered login extensions.

FIG. 4 is a flow diagram illustrating the method according to one embodiment of this invention for initiating a registered login extension. At block 60, login module 28 determines the type of registered login extension to load. According to one embodiment of this invention, a login extension can register as any combination of the following four types: LOGIN_EXT_UI, LOGIN_EXT_AUTHENTICATE, LOGIN_EXT_SCRIPT, LOGIN_EXT_ALL. Preferably, although not necessarily, the login system according to this invention categorizes the overall login process into various phases, and can even allow certain phases to occur without other phases occurring. For example, after initial authentication and script processing has occurred, upon usei request, additional script processing could occur without requiring additional authentication since the user has already been authenticated. Thus, login module 28 would only initiate registered login extensions which have registered as type LOGIN_EXT_SCRIPT or LOGIN_EXT_ALL. Or, a registered login extension may only wish to participate in the user interface processing, and register as LOGIN_EXT_UI. If a registered login extension wishes to receive all events, it can register as LOGIN_EXT_ALL. In this way, registered login extensions which do not wish to participate in certain phases of the login process need not be initiated during those phases. At block 62, login module 28 reads registry 42 and at block 64 determines whether it has reached the end of registry 42, indicating that no more registered extension modules exist. If additional extension modules exist, at block 68 it is determined whether the registered extension in registry 40 should be loaded, based upon its registration type. At block 70 the login extension module, such as first login extension module 44 is initiated. At blocks 72 and 74 login extension module 44 initializes and authenticates with login module 28, as described above. At block 76 login module 28 determines whether the authentication key passed by login extension module 44 is a valid authentication key. If it is, then at block 78 login module 28 accepts the registered extension as either a primary or secondary registered login extension, as described above. If the authentication key is not valid, then at block 80 login module 28 unloads first login extension module 42. The process then resumes again at block 62 where registry 40 is accessed again to determine if additional registered login extension modules exist. Although the login system according to this invention preferably utilizes the registry database available in Windows™ Operating systems, it is apparent that other structures could be utilized to register a login extension and provide login module 28 with sufficient information to initiate the registered login extension module. Other means for authenticating login extension module 44 to login system 26 can be used. For example, a digital signature authentication mechanism can be used, and if login extension module 44 is missing the signature, or contains an invalid digital signature, it will not be allowed to participate in the login process.

Figure 5:
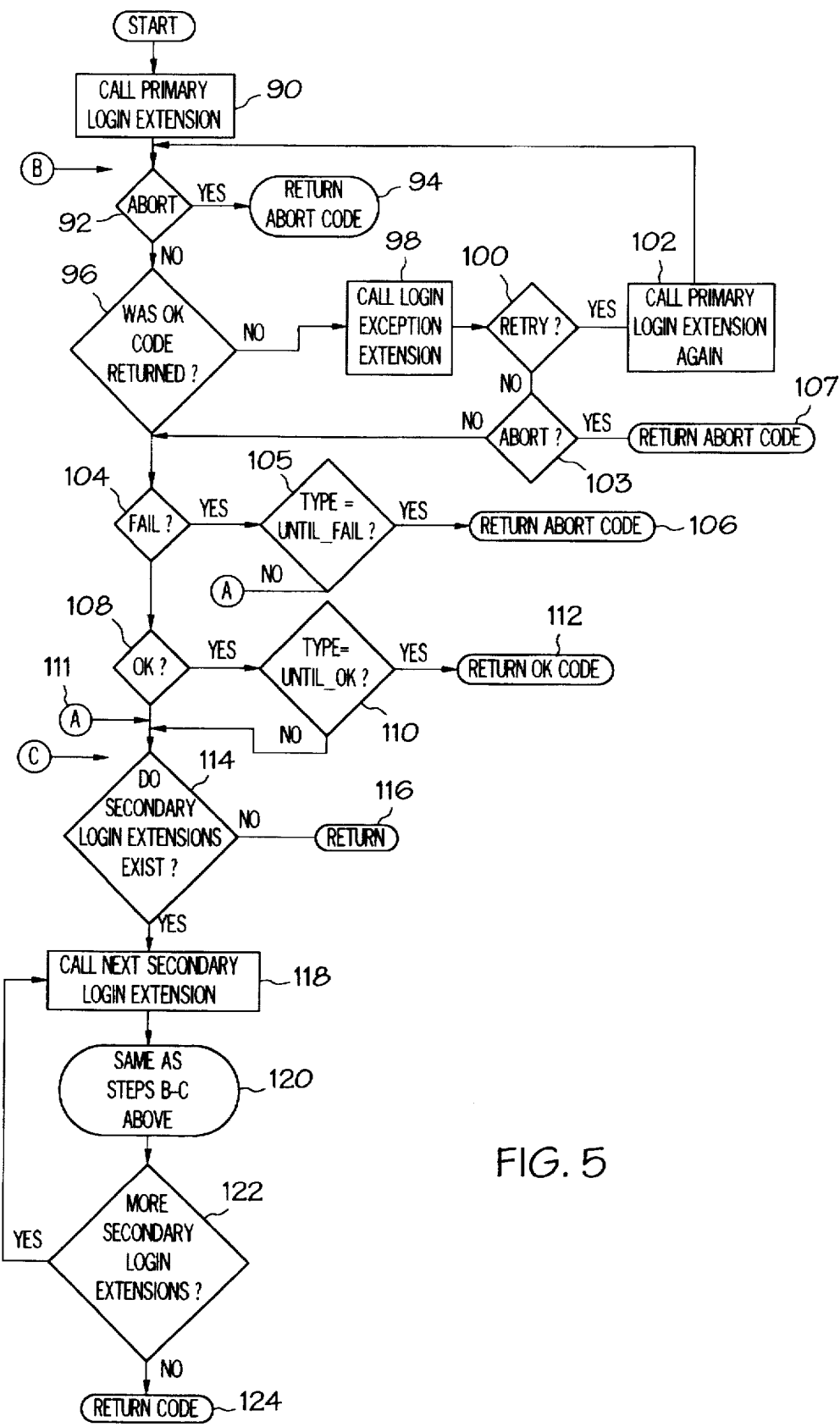
FIG. 5 is a flow diagram illustrating a method according to one embodiment of this invention of the interaction between the event manager and a plurality of login extensions.

For the purposes of illustration, FIG. 5 will be discussed with reference to login system 26 as illustrated in FIG. 3. FIG. 5 is a flow diagram illustrating a method according to one embodiment of this invention of the interaction between event manager 30 and registered login extensions 45, 46, 51 and 52. Event manager 30 is invoked from within login system 26 to manage the handling of all events other than IO events. A process invoking event manager 30 with a particular event examines the return code returned by event manager 30 to determine the status of the handling of the event and can then continue with appropriate subsequent processing.

When invoked with an event such as event 32, event manager 30 at block 90 communicates event 32 to primary registered login extension 45. At block 92 event manager 30 examines the return condition code from primary registered login extension 45, which can be any condition code set forth in Table 4. As described above, registered login extension 45 can either handle the processing of event 32, or pass it on to default login extension 34 for processing. In either case, registered login extension 45 returns a condition code to event manager 30. If registered login extension 45 returns an ABORT condition code, event manager 30 returns the ABORT code to the invoking process at block 94. If an ABORT condition code was not returned at block 92, then event manager 30 determines whether a condition other than an OK condition code was returned. If any condition code other than an OK condition code was returned at block 96, event manager 30 invokes registered login exception extension 46 at block 98. As discussed above, registered login exception extension 46 can process the event and/or pass the event on to default login exception extension 36 for processing. In either case, registered login exception extension 46 returns a condition code to event manager 30.

If the exception is successfully handled, registered login exception extension 46 can return a RETRY condition code at block 100, in which case event manager 30, at block 102, will again invoke registered login extension 45 with event 32. If at block 103 registered login exception extension 46 returns an ABORT condition code, then at block 107 event manager 30 returns an ABORT code to the invoking process. If login exception extension 46 returns neither a RETRY nor an ABORT condition code, then at block 104 event manager 30 determines whether a FAIL condition code was returned. If a FAIL condition code was returned, then at block 105 event manager 30 determines if the type of event is an UNTIL_FAIL event. If so, then at block 106 event manager 30 returns a FAIL condition code to the invoking process. If not, then control branches to block 111. If a FAIL condition code was not returned, then at block 108 it is determined whether an OK condition code was returned. If so, and if at block 110 it is determined that the type of event is an UNTIL_OK event, then at block 112 event manager 30 returns an OK condition code to the invoking process. Otherwise, at block 114 event manager 30 determines if any secondary login extensions have been registered. If not, then at block 116 event manager 30 returns to the invoking process.

If secondary login extensions do exist, then at block 118 event manager 30 calls the next secondary login extension in secondary extension list 38. At block 120 substantially the same processing occurs as described above with respect to the primary login extension. At block 122 it is determined whether another registered login extension exists in the list. If not, event manager 30 returns to the invoking process at block 124. If more secondary login extensions do exist, the next secondary login extension is invoked at block 118. This loop continues until event manager 30 returns to the invoking process due to an ABORT code, or because an UNTIL_FAIL or UNTIL_OK event is satisfied or until no more secondary login extensions exist.

Although login system 26 described herein provides the flexibility of allowing registration of a hierarchy of primary and secondary login extensions, as described above, it is apparent that login system 26 might only provide one type of registered login extension. It should be noted that the login system according to this invention not only allows an installation to develop specific login extensions not inherently provided by the default login extensions 34 and 40, but also enables the developer of the login system to provide additional login features after an initial sale of login system 26.

Figure 6:
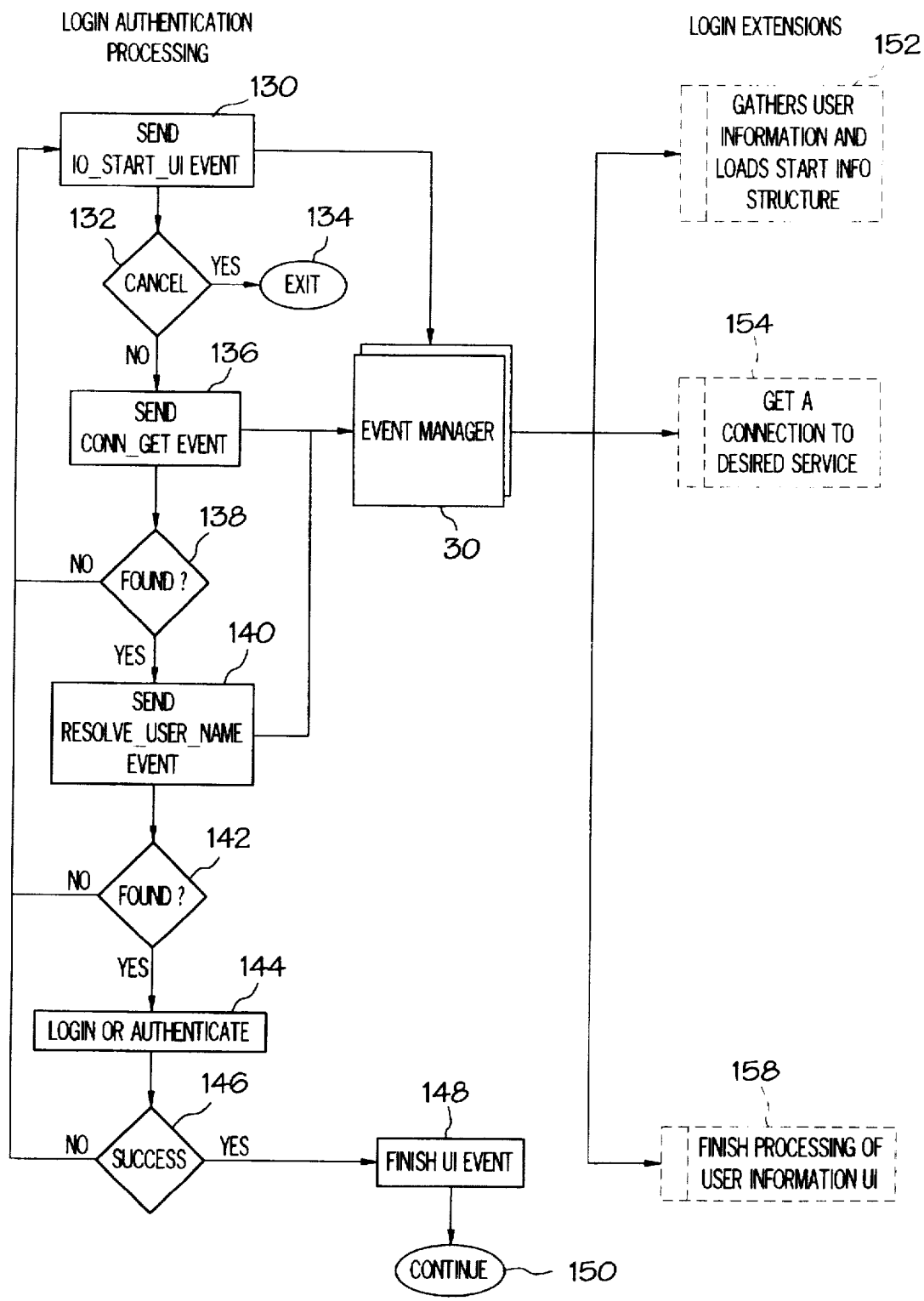
FIG. 6 is a flow diagram illustrating the method according to one embodiment of this invention for authenticating a user of a computer environment and communication of events generated during such processing to login extensions.

FIG. 6 is a flow diagram illustrating the method according to one embodiment of this invention for authenticating a principal who seeks access to a controlled computer resource. FIG. 6 illustrates an embodiment in which all events, including IO events are managed by event manager 30. Event manager 30 can maintain separate pointers to default login IO extension 40, and allow a registered login IO extension such as registered login IO extension 47 to participate in IO event processing. At block 130 an IO_START_UI event is generated and the event is communicated to registered login IO extension 47 via pointer 39. As described above, if no registered login IO extension exists, pointer 39 will point to default login IO extension 40 which will provide the default IO handling processing. The example described herein assumes registered login IO extension 47 has superseded default login IO extension 40. At block 152 either registered login IO extension 47 or default login IO extension 40 requests and receives from the principal the identifying information. At block 136 a CONN_GET event is generated and event manager 30 communicates the event to the appropriate login extensions. A login extension at block 154 attempts to get a connection to the desired service. If at block 138 the desired service is not found then control returns to block 130 to attempt another login. If the connection was found then at block 140 a RESOLVE_USER_NAME event is generated and event manager 30 communicates the event to the appropriate login extensions. At block 142 if the user name was found then at block 144 the identifying information is passed to authentication system 22 for authentication. If at block 146 the user is properly authenticated then at block 148 an IO_FINISH_UI event is generated and event manager 30 communicates the event to the appropriate login extensions. At block 158 one or more login extensions receive the IO_FINISH_UI event and provides the desired processing. At block 150 after the user has been authenticated, additional login processing occurs.

Each login extension can have one or more associated script files. The word files is used to refer to one or more commands, and does not necessarily mean the commands are in a file—they could also merely be commands maintained in memory. The login system according to one embodiment of this invention processes the script files one login extension at a time. First the primary login extension's script files are processed, then each registered secondary login extension's script files are processed. This is accomplished by sending an OPEN_SCRIPT event to only one particular login extension at a time, by utilizing the PRIVATE broadcast type for the OPEN_SCRIPT event. Then a GET_SCRIPT_LINE event is generated and sent to the particular login extension being processed, again by utilizing the PRIVATE broadcast type. Next a PARSE_SCRIPT_LINE event is generated, which is BROADCAST to all login extensions, to allow any login extension to parse the command line. The command event associated with the script line is also communicated to each login extension, to allow any login extension to take a certain action upon recognizing a certain script command. When the particular login extension has no more script files to process, it will return a FAIL event, in which case the next login extension's script files will be processed.

Figure 7:
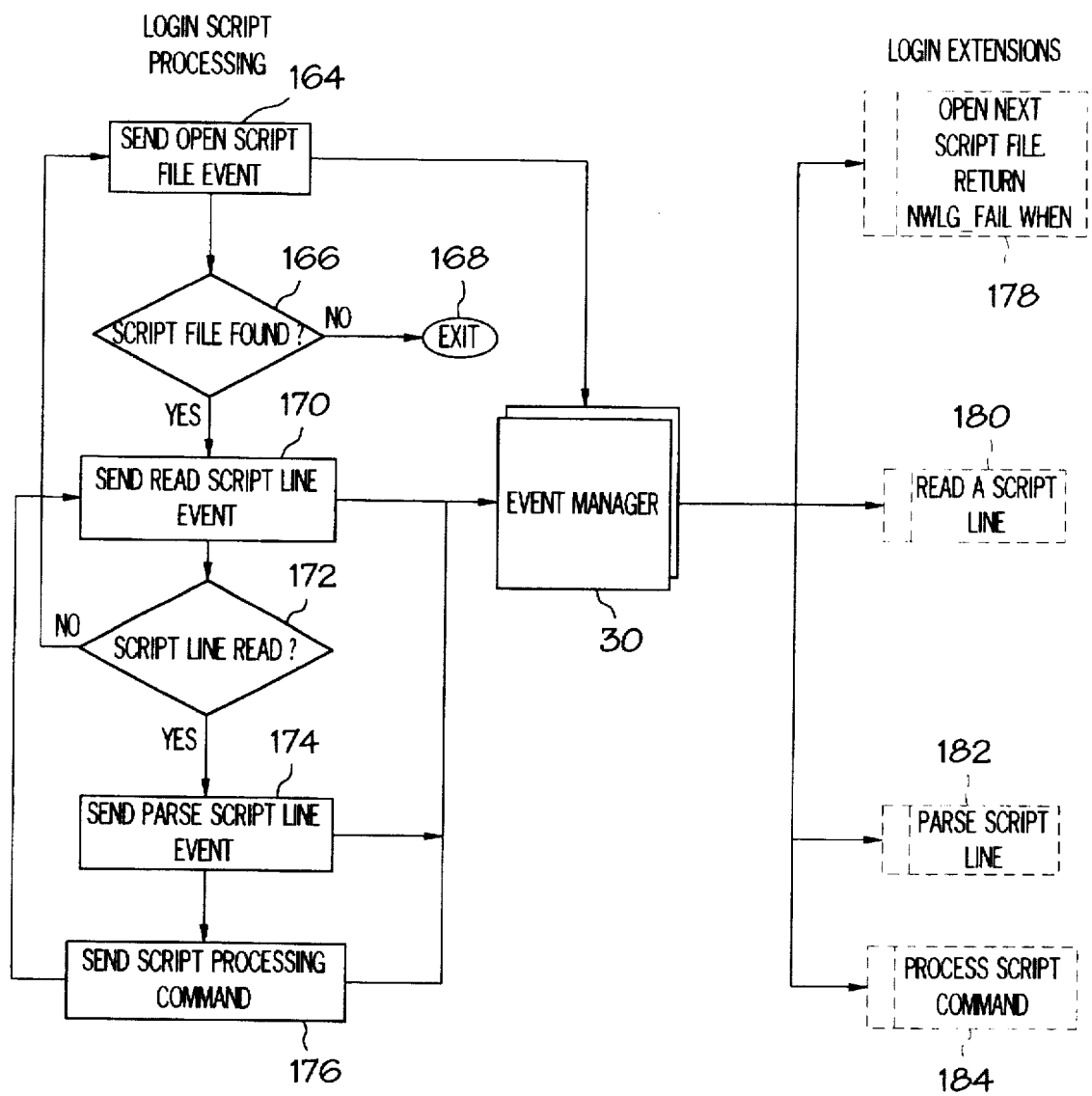
FIG. 7 is a flow diagram illustrating a method according to one embodiment of this invention for processing commands implemented by a registered login extension according to one embodiment of this invention.

Referring to FIG. 7, at block 164 an OPEN_SCRIPT event is generated and communicated to event manager 30. Event manager 30 passes the OPEN_SCRIPT event to the appropriate login extension. At block 178 the login extension which was passed the OPEN_SCRIPT event opens its first script file. Upon determining that no more script files exist, the login extension will return a FAIL condition code to indicate that all script files for this extension have been processed. Event manager 30 will return the FAIL condition code to the invoking process to inform it that this login extension has no more script files. If at block 166 event manager 30 returns an OK condition code, then at block 170 a GET_SCRIPT_LINE event is communicated to event manager 30. Event manager 30 communicates the GET_SCRIPT_LINE event to the particular login extension being processed.

At block 180 the login extension reads the script line from the open script file, and returns the script line with an OK condition code to event manager 30. Event manager 30 returns an OK condition code and the script line to the invoking process. If, at block 172, the login extension returns a FAIL condition code, then processing begins again for the next script file at block 164. If the script line is successfully read, then at block 174 a PARSE_SCRIPT_LINE event is communicated to event manager 30. Event manager 30 passes the event to all appropriate login extensions and at block 182 a login extension parses the script line. If the login extension parsing the script line recognizes the command, it returns the command event associated with the particular command, otherwise it returns an UNKNOWN_COMMAND event code. At block 176, the command event returned by the login extension parsing the script processing command is communicated to event manager 30. Event manager 30 communicates the command event to all appropriate login extensions and at block 184 one or more login extensions process the command event as desired. If a particular registered login extension is implementing a new script file command, when that registered extension received the UNKNOWN_COMMAND event it would examine the script file command line to determine if the unknown command was in fact the new command the registered login extension was implementing. If so, the registered login extension would then take the appropriate processing action.

The login system according to this invention also enables registered login extensions to create new events. For example, a site can develop a registered login extension which parses script file processing commands looking for a particular site-implemented command. When the registered login extension encounters the site-implemented command, it invokes event manager 30 and passes to event manager 30 a predetermined event number which is not used by the default login system. Event manager 30 communicates the event to the login extensions as described above. The event will be ignored by those extensions which do not recognize it, and can be processed by the site-developed registered login extension which is capable of handling the predetermined event. In this manner, registered login extensions can communicate among themselves using events.

The login system according to this invention also enables a site to develop a single signon login system. This can be achieved by developing a registered login extension which receives the identifier from a principal, and invokes other login systems passing to the systems the identifier. The other login systems can then authenticate the identifier and return a SUCCESS or FAIL condition. If a FAIL condition is returned, the registered login extension can request from the principal another userid and password for logging into that particular controlled resource. If a user intentionally synchronizes his userid and password across a plurality of controlled resources, then only a single signon will be required.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. In a computer-implemented login system having event driven functionality, a method for integrating additional functionality into the login system, the method comprising:
 (a) establishing a plurality of events, each event corresponding to a predetermined activity in the login process;
 (b) registering with the login system a first login extension operative to receive notification of at least some of the events and operative to one of provide functionality in response to a received notification and take no action with regard to the received notification;
 (c) initiating the registered first login extension;
 (d) determining if the registered first login extension is a valid registered login extension, and if it is valid:
  (i) enabling interaction with the registered first login extension, and
  (ii) communicating the notification of the event to the registered first login extension, and if it is not valid:
   (i) prohibiting interaction with the registered first login extension.

2. In a computer-implemented login system according to claim 1, wherein the determining step comprises:
 receiving an authentication key from the registered first login extension;
 determining if the authentication key is a valid authentication key, and if it is, returning an ok condition code to the registered first login extension.

3. In a computer-implemented login system according to claim 1, wherein the enabling step comprises passing to the login system a structure containing a pointer to the first registered login extension for invocation upon the generation of an event.

4. In a computer-implemented login system according to claim 3, further comprising maintaining a list of pointers to structures, each structure including a pointer to a registered login extension for invocation upon the generation of an event.

5. In a computer-implemented login system according to claim 1, further comprising registering the first login extension as one of a primary login extension and a secondary login extension.

6. In a computer-implemented login system according to claim 5, further comprising providing a default login extension, and registering the first login extension as a primary login extension to replace the default login extension.

7. In a computer-implemented login system according to claim 1, further comprising registering a first exception login extension associated with the registered first login extension, receiving from the registered first login extension a fail condition code, and communicating notification of the event to the registered first exception login extension in response to the receipt of the fail condition code.

8. In a computer-implemented login system according to claim 7, further comprising receiving from the registered first exception login extension a retry condition code, and recommunicating notification of the event to the registered first login extension in response to the receipt of the retry condition code.

9. In a computer-implemented login system according to claim 1, further comprising registering with the login system a second login extension operative to receive a notification of an event and operative to provide additional functionality in response to the received notification, and
 controlling the communication of the event to the registered first and second login extensions as a function of a communication type of the event.

10. In a computer-implemented login system according to claim 1, further comprising
 registering with the login system a second login extension operative to receive a notification of an event and operative to provide additional functionality in response to the received notification, and
 controlling the communication of the event to the registered second login extension as a function of a returned condition code from the registered first login extension.

11. A method for integrating additional functionality into a login system, the method comprising:
 establishing an plurality of event each event corresponding to a predetermined activity in the login process;
 managing the processing of a plurality of events in a computer environment with an event manager capable of communicating events to multiple login extensions, the event manager having a default event interaction with a default login extension;
 registering a login extension with the login system;
 authenticating the login extension to the login system;
 modifying the default event interaction in response to the registration to include communication of at least one event to the registered login extension.

12. In a method for integrating additional functionality into a login system according to claim 11, wherein the authentication step comprises:
 receiving an authentication key from the registered login extension;
 determining if the authentication key is a valid authentication key, and if it is, returning an ok condition code to the login extension.

13. In a computer-implemented login system according to claim 11, further comprising passing to the login system a structure containing a pointer to the login extension for invocation upon the generation of an event.

14. In a method for integrating additional functionality into a login system according to claim 11, wherein the modifying the default event interaction step comprises inhibiting communication of events to the default login extension.

15. In a method for integrating additional functionality into a login system according to claim 11, wherein the modifying the default event interaction step comprises communicating an event to the default login extension and to the registered login extension.

16. In a method for integrating additional functionality into a login system according to claim 15, further comprising communicating the event to the registered login extension as a function of a returned condition code from the default login extension.

17. In a method for integrating additional functionality into a login system according to claim 11, further comprising maintaining a list of pointers to structures, each structure having a pointer to a registered login extension. receiving an event, traversing the list of pointers to structures, and communicating the event to each registered login extension in the structures.

18. A login system capable of integrating additional functionality into the login system, comprising:

- a plurality of events, each event corresponding to a predetermined activity in the login system process;
- a first memory including an event manager operative to communicate a notification of an event to a plurality of login extensions;
- a second memory including a default login extension operative to provide login functionality in response to the notification of the event;
- a third memory including an authenticated registered login extension operative to receive the notification of the event and to provide additional functionality in response to the received notification.
- a fourth memory including a list of registered login extensions.

* * * * *

UNITED STATES PATENT AND TRADEMARK OFFICE
CERTIFICATE OF CORRECTION

PATENT NO. : 5,781,724
DATED : July 14, 1998
INVENTOR(S) : Carlos A. Nevarez et al.

It is certified that error appears in the above-identified patent and that said Letters Patent is hereby corrected as shown below:

Column 20, line 24, delete "an plurality of event" and replace with --a plurality of events,--.

Column 21, line 8, delete "system".

Signed and Sealed this

Twenty-seventh Day of October, 1998

Attest:

BRUCE LEHMAN

Attesting Officer    Commissioner of Patents and Trademarks